United States Patent [19]
Eckersten et al.

[11] Patent Number: 5,341,145
[45] Date of Patent: Aug. 23, 1994

[54] METHOD FOR TRACKING A RADAR TARGET

[75] Inventors: Christer Eckersten, Järfälla; Bengt-Olof Ås, Täby, both of Sweden

[73] Assignee: NobelTech Electronics AB, Jarfalla, Sweden

[21] Appl. No.: 4,236

[22] Filed: Jan. 14, 1993

[30] Foreign Application Priority Data

Jan. 16, 1992 [SE] Sweden .................. 9200123-9

[51] Int. Cl.$^5$ .................................................. G01S 13/44
[52] U.S. Cl. .................................... 342/148; 342/149; 342/150; 342/152; 342/194
[58] Field of Search ............... 342/148, 149, 152, 151, 342/150, 194

[56] References Cited

U.S. PATENT DOCUMENTS

| | | | |
|---|---|---|---|
| 3,772,695 | 11/1973 | Hoffman | 342/77 |
| 3,778,829 | 12/1973 | Longuemare, Jr. et al. | 342/92 |
| 4,163,975 | 8/1979 | Guilhem et al. | 342/94 |
| 4,646,095 | 2/1987 | Kanter | 342/149 |
| 4,719,465 | 1/1988 | Kuroda | 342/151 |
| 4,789,861 | 12/1988 | Baggett et al. | 342/152 |
| 4,796,031 | 1/1989 | Koki | 342/148 |
| 4,862,177 | 8/1989 | Wong | 342/160 |
| 4,994,810 | 2/1991 | Sinsky | 342/151 |

OTHER PUBLICATIONS

IEEE Transactions on Aerospace and Electronic Systems, AES-7 (1971-01): 1 S. M. Sherman: "Complex Indicated Angles Applied to Unresolved Radar Targets and Multipath", p. 160-p. 170.
Proceedings of the IEEE, vol. 62, No. 6, Jun. 1974, "Low-Angle Radar Tracking", David K. Barton, Fellow IEEE, pp. 687-704.

*Primary Examiner*—John B. Sotomayor
*Attorney, Agent, or Firm*—Pollock, Vande Sande & Priddy

[57] ABSTRACT

In a method for tracking a radar target the imaginary part of the complex elevation error signal is utilized and the value of the complex elevation error signal is calculated for a plurality of frequencies in a repeated sequence. The value change between the different frequencies is used for determining the position within an unambiguous interval and the values calculated at the zero crossing are utilized as measure of the inclination which in turn is compared with inclinations calculated for zero crossings in a general case, whereby a single-valued (unambiguous) interval and position can be determined and thereby the associated elevation angle or target height can be calculated. The method is specifically useful for tracking at low height where multi-path propagation poses a problem in tracking according to known methods.

9 Claims, 2 Drawing Sheets

METHOD FOR TRACKING A RADAR TARGET

FIELD OF THE INVENTION

The present invention relates to a method for tracking a radar target, particularly with low-altitude tracking, in which the imaginary part of the complex elevation error signal is utilized.

BACKGROUND OF THE INVENTION

In tracking a target and particularly a target at a low altitude, problems arise due to multi-path propagation. These problems have been known since the beginning of radar technology. Many attempts have been made to solve the problems especially at sea where it is important to be able to detect and follow missiles or rockets which move as close to the surface of the sea as a few meters, so-called "sea skimmers".

A distinguished overview of different methods and their shortcomings is found in D. K. Barton, Low-Angle Tracking, Proc. IEEE 62, No. 6, June 1974, pages 687-704. In S. M. Sherman, "Complex indicated angles applied to unresolved radar targets and multipath", IEEE Trans. Aerosp. Electron Syst., vol AES-7, January 1971, pages 160-170, where the utilization of complex angles in multi-path propagation is described. The present invention relates to a further development of this method.

SUMMARY OF THE INVENTION

The method according to the present invention is characterised in that:
a) the value of the imaginary part of the complex elevation error signal is calculated on the basis of radar signal information occurring for a plurality of frequencies in a repeatable sequence,
b) the calculated values of the imaginary part of the complex elevation error signal according to step a for the different frequencies are utilized for identifying the position of the target within an unambiguous interval and thereby the target position in relation to a zero crossing of the imaginary part of the complex elevation error signal, located within the unambiguous interval,
c) the values of the imaginary part of the complex elevation error signal calculated for positions in proximity to the zero crossing are utilized for determining a measure of the inclination of the imaginary part at the zero crossing,
d) the inclination determined in accordance with step c above is compared with inclinations calculated in the general case for zero crossings for determining unambiguous interval of the current zero crossing,
e) the elevation angle or target height is calculated on the basis of the unambiguous interval association and position of the target within the unambiguous interval. The method provides for satisfactory tracking of the target which is located at a low altitude in an environment with multi-path propagation.

The sign combination of the calculated values is advantageously studied at point b and the unambiguous interval association and position of the target within the unambiguous interval suitably undergoes a filtering function before the elevation angle or target height is calculated.

As a measure of the inclination of the imaginary part, the difference between values situated on either side of an assumed zero crossing is utilized. According to a simple variant, only one value on either side of the assumed zero crossing is utilized. In a more sophisticated variant, the values of several values available on each side of the assumed zero crossing are weighted together.

The imaginary part of the complex elevation error signal $Im[D_{el}]$ is defined by and calculated from the relation:

$$Im[D_{el}] = \frac{S_I \cdot D_Q - S_Q \cdot D_I}{S_I^2 + S_Q^2},$$

where
$S_I$ is the in-phase component of the sum channel
$S_Q$ is the quadrature component of the sum channel
$D_I$ is the in-phase component of the difference channel vertically and
$D_Q$ is the quadrature component of the difference signal vertically.

The signal components $S_I$, $S_Q$, $D_I$, $D_Q$ are accessible in known radar receivers.

According to a preferred method, the imaginary part of the complex elevation error signal is investigated as a function of a variable n defined as $$n = \frac{2h_r}{\lambda} \cdot \frac{h_t}{R}$$

where
$h_r$ = height of the radar
$h_t$ = height of the target
$\lambda$ = radar wavelength used
$R$ = distance between radar and target.

A general case exhibits zero crossings for $n = 1.5, 2.5, 3.5$ and the like.

Tracking based on the complex elevation error signal is suitable for tracking at a low altitude. Other conventional methods can take over the tracking under different altitude conditions. According to another preferred method, tracking based on the complex elevation error signal is only utilized with tracking at a low altitude.

In a vessel-mounted radar, the radar height $h_r$ varies due to rolling, pitching and/or yawing. Compensation for this variation is obtained in accordance with a preferred method by the output signal from a vertically sensing accelerometer being used after two integrations to correct for variation in the radar height.

In the text which follows, the invention will be described in greater detail with reference to the attached drawings, in which

DETAILED DESCRIPTION OF THE PREFERRED EMBODIMENT

Figure 1:
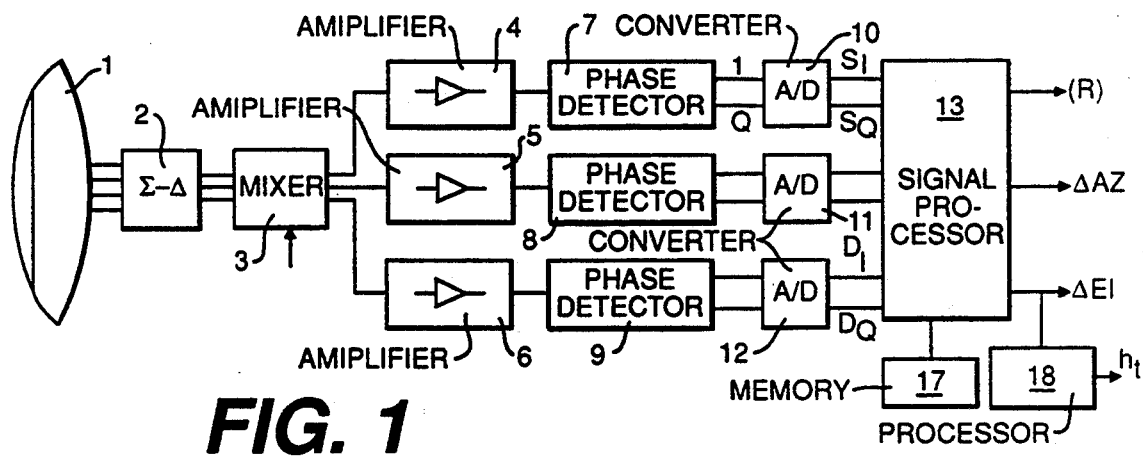
FIG. 1 diagrammatically shows parts of a radar receiver, utilizing so-called monopulse technology in an embodiment with three parallel MF channels.

The radar receiver shown in FIG. 1 comprises an antenna 1, preferably provided with four feeders in a quadratic configuration in a known manner and not shown.

A sum-forming and difference-forming circuit 2 forms a sum signal and difference signals representing error signals in the side angle and elevation. A mixer 3 transforms the sum signal and the difference signals to an intermediate frequency to be amplified in intermediate-frequency amplifiers 4, 5, 6. The three intermediate-frequency signals, that is one sum signal and two difference signals, are each compared in a phase detector 7, 8 and 9, respectively, with a reference signal. The phase detectors each provide an in-phase and a quadrature component which are analog/digital converted in A/D convertors 10, 11, 12. At the output of the A/D convertor 10, the sum channel in-phase component $S_I$, and the quadrature component $S_Q$ are available in digital form. At the output of the A/D convertor 12, in-phase and quadrature components at right angles $D_I$ and $D_Q$ to one another, are found in a corresponding manner. Corresponding components are obtained also at the output of the A/D convertor 11 for the difference signal laterally. The difference signal laterally is of no greater interest here and will therefore not be treated in greater detail in the following text.

Starting with the signal information obtained from the A/D convertors, a signal processor 13 calculates the distance R and the error signal in elevation $D_{el}$ and azimuth $D_{az}$.

In low-altitude tracking, the signal processor 13 digitally forms the complex error signal $D_{el}$ in form the in-phase and quadrature components of the sum channel and the difference channel in elevation according to the expressions:

$$Re[D_{el}] = \frac{S_I \cdot D_I + S_R \cdot D_Q}{S_I^2 + S_Q^2}$$

$$Im[D_{el}] = \frac{S_I D_Q - S_Q D_I}{S_I^2 + S_Q^2}$$

where $Re[D_{el}]$ is the real part of the complex error signal and $Im[D_{el}]$ is its imaginary part.

Figure 2A:
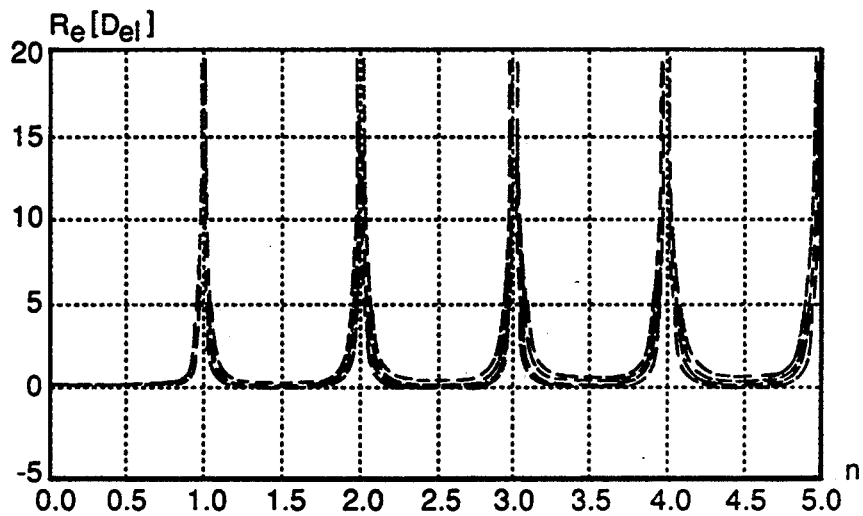
FIG. 2a shows the real part of the complex elevation error signal for a general case as a function of a variable n.
Figure 2B:
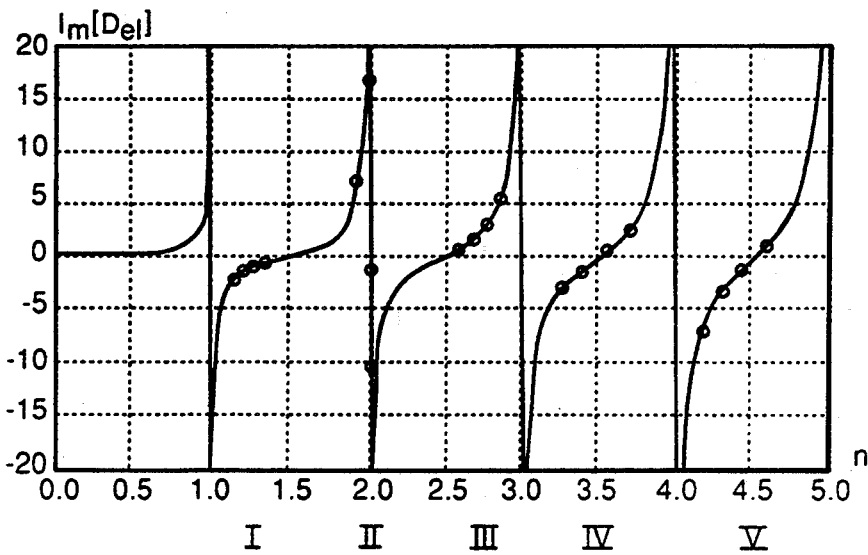
FIG. 2b shows the imaginary part of the complex elevation error signal for a general case as a function of the variable n.

FIG. 2a shows how the real part of the complex error signal varies as a function of a variable n and FIG. 2b shows the variation of the imaginary part as a function of the same variable n. The variable n is defined as $$n = \frac{2h_r}{\lambda} \cdot \frac{h_t}{R},$$

$h_r$=radar height
$h_t$=target height
$\lambda$=radar wavelength used
R=distance between radar and target.

Figure 3:
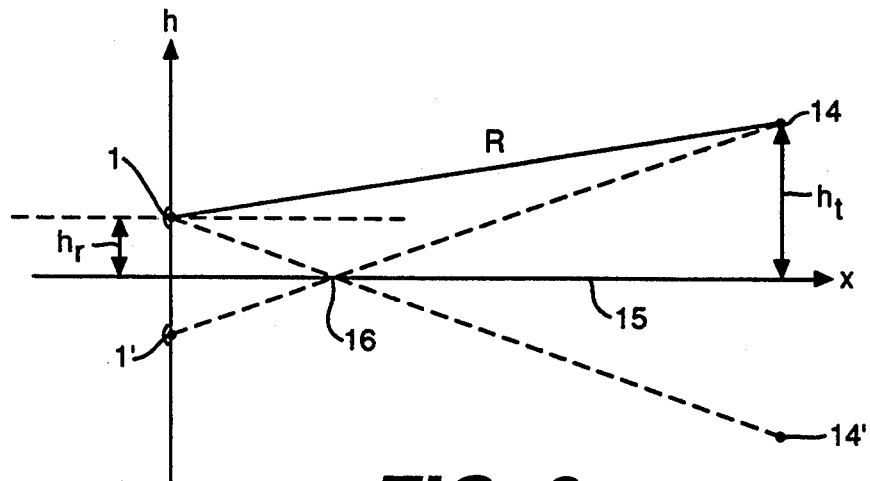
FIG. 3 shows two-path propagation of a radar signal in the case where the earth surface in the environment of the radar tracking is considered as plane.
Figure 4:
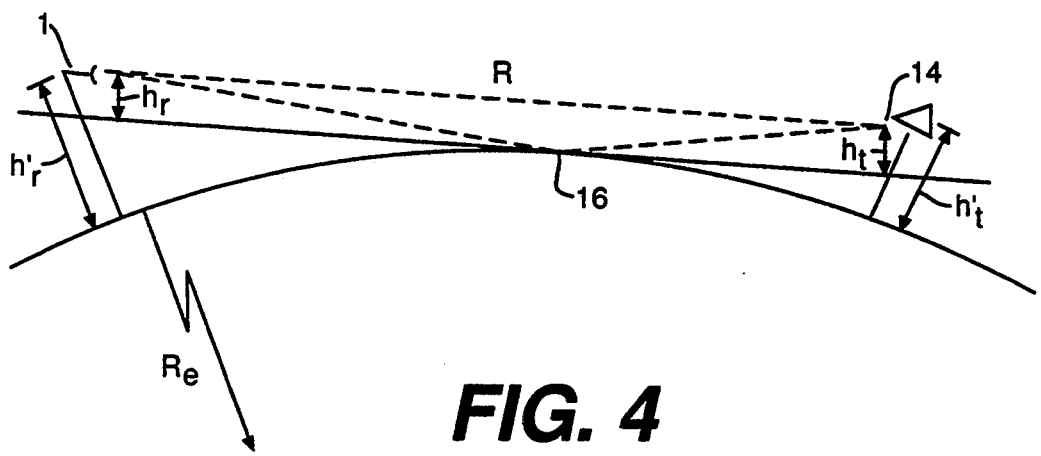
FIG. 4 shows two-path propagation of a radar signal where the curvature of the earth surface is taken into consideration within the radar tracking environment, and FIG. 5 diagrammatically shows in a block diagram form the function of a processor used in the radar receiver.

FIGS. 3 and 4 show how $h_r$, $h_t$ and R are defined for the case where the earth surface is considered simplified as flat within the target tracking range, FIG. 3, and the case where the earth surface shows a curvature within the target tracking range, FIG. 4. In the latter case the following applies:

$h_r$=f(h′$_r$, R, R$_e$, h′$_t$) and
$h_t$=f(h′$_t$, R, R$_e$, h′$_r$), where the definition of the designations can be seen in FIG. 4 and R$_e$ varies with the atmospheric conditions and in a normal case is of the order of magnitude of 4/3 of the earth radius, that is R$_e$ approximately equals 8500 km. The target has been designated by 14 and the earth surface by 15 in FIGS. 3 and 4. In FIG. 3, the mirror image of the radar antenna and target has been designated as 1′ and 14′, respectively, and occurs as reflection in the surface 15 at point 16.

On studying the variations of the imaginary part of the error signal in elevation as a function of n, shown in FIG. 2b, the following interesting characteristics of the imaginary part can be noted. It should be noted that if the target goes at a constant or mainly constant height, the variable n will increase with decreasing distance between target and radar, that is to say the decreasing distance means moving to the right in FIG. 2b.

The value of the imaginary part of the error signal goes through zero when the signal in the sum channel has a maximum the same time as the real part indicates an elevation angle =0, that is an angular position in the center between the target 14 and its mirror image 14′.

The derivative in the zero crossings increases with increasing n, that is increasing elevation angle.

The values in the proximity to the zero crossings are mainly independent of the reflection factor as distinct from the real part of the error signal.

With greater elevation angles, the imaginary part of the error signal goes towards zero since the multipath problem caused by reflected radiation reaching the receiver ceases. This elevation angle range is not shown in FIG. 2b.

The characteristics of the imaginary part of the error signal in vertically Im[$D_{el}$] are utilized in the following manner:

It is assumed here that the radar has the capability of quickly changing frequency. This capability is used for transmitting in rapid succession, for example, four known frequencies spread over as wide a bandwidth as possible. FIG. 2b indicates five examples I–V of values which can be obtained for the imaginary part of the error signal Im[$D_{el}$] for the four frequencies. It can be observed that a certain frequency variation provides a greater variation in n the higher the value of n is. There is a constant percentage variation.

Figure 5:
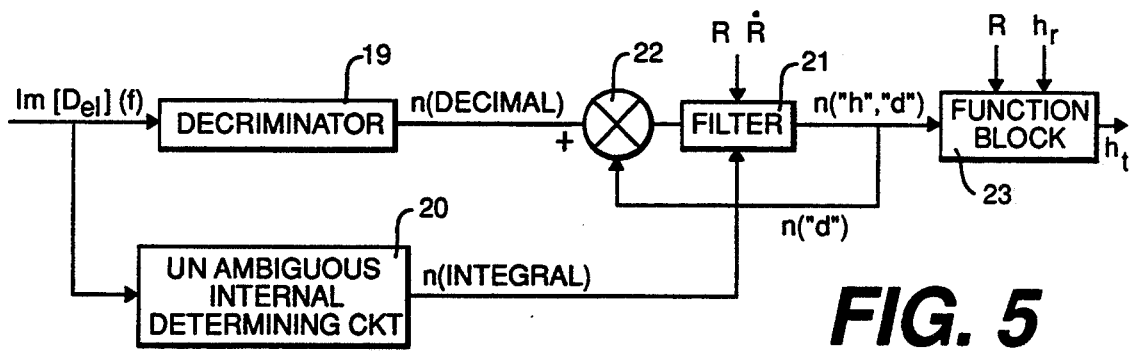

The values obtained for Im[$D_{el}$] are registered and stored, which can be done in a memory 17 connected to the signal processor 13. The content of this memory 17 is further processed in a special processor 18, the function block of which is shown diagrammatically in FIG. 5. The processor comprises a discriminator 19, an unambiguous interval determining circuit 20 and also circuits which will be described below.

In the discriminator unambiguous interval 19, it is determined where the target is located in elevation within a single-valuedness interval or an unambiguous interval. In a first embodiment, this can be produced, for example, by investigating only the sign of the imaginary error signal. If, for example, the combination − − + + is obtained, the target 14 is located in the center of an interval, for example n=3.5 according to example IV but can also lie at n=1.5, 2.5, 4.5 and so forth. Example I with sign combinations − − − − indicates a target position between 1.0 and 1.5, 2.0 and 2.5 and so forth. Example II with the sign combination + + − − provides n=1, 2, 3 ... Example III with the sign combination + + + + indicates that the target lies between 1.5 and 2.0, 2.5 and 3.0 and so forth. Example V with the sign combination − − − + specifies that the target is located within interval 1.0–1.5, 2.0–2.5, and so forth and closer to the upper limit within the interval than the lower limit.

The angle error signal Im[$D_{el}$] is also supplied to unambiguous interval determining circuit 20 which operates when the target is located in or close to a zero crossing. By this means, the value of the imaginary error signal is utilized for determining a measure of the derivative or the inclination in the zero crossing. The difference between first and last value in the sign combination and/or the difference between two intermediate values in the sign combination is determined and individually or in combination determines a measure of the derivative. When the measure of the derivative has been determined, it can be established in which unambiguous interval or in which many valuedness the target is really located and thereby the value of n.

It can be observed that with high values of n, say n≈10, and a suitable frequency variation of approximately 10%, the value of n can be directly determined. The frequency variation then covers a whole integral-number interval at n and the two-step method described above does not need to be used. Furthermore, it can be observed that not only the inclination, that is to say the first derivative, but also the second derivative of the variation of Im[$D_{el}$] with frequency can be used for determining the unambiguous interval. The last-mentioned however applies only for a limited intermediate value range of n.

The determination according to the above is affected by certain uncertainties due to measurement noise and the like. To eliminate these, the two measurement values, n (decimal) and n (integral), are supplied to a filter circuit 21, where a "model" of the target is generated, whereby the probability in the measured n values can also be taken into consideration by supplying the distance R to the target and its variation with time, the radial speed R, to the circuit. The output signal from the filter 21 is designated n ("h", "d") and consists of an integral number part and a decimal part. The decimal part n ("d") mainly varies continuously and is compared in a comparator 22 with the decimal value which is obtained from the discriminator 19. The difference, the output signal from the comparator, drives the target model which thereby smooths and filters the output signal from the discriminator 19 and unambiguous interval determining circuit 20.

In the last function block 23, the target height calculation, the target height $h_t$ is now calculated from the above relationship.

$$n = \frac{2h_r}{\lambda} \cdot \frac{h_t}{R} \text{ i.e.}$$

$$h_t = \frac{n \cdot \lambda \cdot R}{2h_r},$$

where the radar height $h_r$ and wavelength are known and the distance R is obtained from the signal processor 13 in FIG. 1 in a previously known manner.

In the case where the radar is mounted on a vessel, the height $h_r$ can vary due to rolling, pitching and/or yawing. To compensate for this variation, the radar can be provided with an accelerometer, not shown, which senses vertical accelerations. After two integrations, the output signal of the accelerometer can be used for dynamical correction of $h_r$.

In the text above, examples have been described which utilize four frequencies. There is nothing to prevent a greater or lesser number of frequencies being utilized in accordance with what is found to be suitable in the actual case.

We claim:

1. A method for tracking a radar target, particularly in low-altitude tracking, in which the imaginary part of the complex elevation error signal is utilized, said method comprising the steps of:
   a) calculating the value of the imaginary part of the complex elevation error signal on the basis of radar signal information occurring for a plurality of frequencies in a repeatable sequence;
   b) utilizing the calculated values of the imaginary part of the complex elevation error signal according to the above step a for the different frequencies for identifying the position of the target within an unambiguous interval;
   c) utilizing the values of the imaginary part of the complex elevation error signal calculated for positions in proximity to the zero crossing for determining a measure of the inclination of the imaginary part at the zero crossing;
   d) comparing the inclination determined in accordance with the above step c with inclinations calculated in the general case for zero crossings for determining the unambiguous interval of the current zero crossing;
   e) calculating the elevation angle or target height on the basis of the unambiguous interval association and position of the target within the unambiguous interval.

2. A method according to claim 1, whereby the sign combinations of the calculated values of the imaginary part of the complex elevation error signal for the different frequencies are investigated for identifying the target within said unambiguous interval.

3. A method according to claim 1, wherein the target unambiguous interval association and position within the unambiguous interval undergo a filtering function before the elevation angle or target height are calculated.

4. A method according to claim 3, wherein the filtering function is based on an earlier unambiguous interval association, position within the, distance from the target and variation of distance with time.

5. A method according to claim 1, wherein the difference between values located on each side of an assumed zero crossing is utilized as a measure of the inclination of the imaginary part.

6. A method according to claim 1, wherein the imaginary part of the complex elevation error signal $Im[D_{el}]$ is calculated from the relation:

$$IM[D_{el}] = \frac{S_I \cdot D_q - S_q \cdot D_I}{S_I^2 + S_Q^2}$$

wherein
$S_I$ is the in-phase component of the sum channel
$S_Q$ the quadrature component of the sum channel
$D_I$ is the in-phase component of the difference channel vertically and
$D_Q$ is the quadrature component of the difference channel vertically.

7. A method according to claim 1, wherein the imaginary part of the complex elevation error signal is investigated as a function of the variable n defined as:

$$n = \frac{2h_r}{\lambda} \cdot \frac{h_t}{R}$$

wherein
$h_r$ = radar height
$h_t$ = target height
$\lambda$ = radar wavelength used
R = distance between radar and target.

8. A method according to claim 1, wherein tracking based on the complex elevation error signal is only used when tracking at low altitude.

9. A method according to claim 1, wherein the output signal from a vertically sensing accelerometer is used after two integrations for correcting for variation in the radar height.

* * * * *